United States Patent [19]
Narayanaswami

[11] Patent Number: 5,844,571
[45] Date of Patent: Dec. 1, 1998

[54] Z BUFFER BANDWIDTH REDUCTIONS VIA SPLIT TRANSACTIONS

[75] Inventor: Chandrasekhar Narayanaswami, Valhalla, N.Y.

[73] Assignee: International Business Machines Corporation, Armonk, N.Y.

[21] Appl. No.: 662,426

[22] Filed: Jun. 10, 1996

[51] Int. Cl.[6] .................................................. G06T 15/40
[52] U.S. Cl. ............................................................ 345/422
[58] Field of Search ................................... 395/122–124; 345/422–424

[56] References Cited

U.S. PATENT DOCUMENTS

| | | | |
|---|---|---|---|
| 5,265,214 | 11/1993 | Nitta ........................................ | 345/422 |
| 5,268,995 | 12/1993 | Diefendorff et al. .................... | 345/422 |
| 5,278,949 | 1/1994 | Thayer ..................................... | 345/426 |
| 5,301,263 | 4/1994 | Dowdell .................................. | 345/422 |
| 5,307,450 | 4/1994 | Grossman ................................ | 345/423 |
| 5,459,822 | 10/1995 | Izawa et al. ............................. | 345/422 |
| 5,467,459 | 11/1995 | Alexander et al. ...................... | 345/514 |
| 5,542,025 | 7/1996 | Brown .................................... | 345/422 |

OTHER PUBLICATIONS

Foley et al., Computer Graphics: Principles and Practice, pp. 649–698, 1990.
"Emerging Memory Solutions for Graphics Applications", K. Suizu, T. Ogawa and K. Fujishima, IEICE Trans. Electron., vol. E78–C, No. 7, Jul. 1995, pp. 773–781.
"Computer Graphics, Principles and Practice", Second Edition, J.D. Foley, A. van Dam, S.K. Feiner and J.F. Hughes, Addison–Wesley Publishing Company.

Primary Examiner—Anton Fetting
Attorney, Agent, or Firm—Jay P. Sbrollini

[57] ABSTRACT

In computer graphics systems, a view of scene of primitives is represented by pixel data associated with a set S of pixels. The present invention identifies whether a given primitive is visible at the set S of pixels by storing in a buffer, for each pixel P belonging to set S, a depth value $Z_{old}$ associated with the pixel P. The depth value $Z_{old}$ is partitioned into a plurality of portions including a most significant portion and at least one less significant portion. The buffer comprises a plurality of contiguous blocks each storing corresponding portions of the depth value $Z_{old}$ for a given set SP of consecutive pixels belonging to set S. A set SQ of consecutive pixels belonging to set S that cover the given primitive is determined. The most significant portion of the depth value $Z_{old}$ of the set SQ of consecutive pixels are fetched from the buffer. For each pixel Q belonging to set SQ, the most significant portion of the depth value $Z_{old}$ of the particular pixel is compared to the most significant portion of the computed depth value $Z_{new}$ of the particular pixel to determine if one of three conditions is satisfied: a) the given primitive is visible at the particular pixel, b) the given primitive is hidden at the particular pixel, or c) it is undetermined whether the given primitive is either visible or hidden at the particular pixel. If condition a) is satisfied, the blocks of the buffer associated with the particular pixel is updated to store the computed depth value $Z_{new}$ of the particular pixel. If condition b) is satisfied, the processing ends with respect to the particular pixel. If condition c) is satisfied, the fetching step and comparing step above is repeated for the next less significant portion of the depth values $Z_{old}$ and $Z_{new}$ associated with the particular pixel until the least significant portion of the depth values $Z_{old}$ and $Z_{new}$ has been processed.

6 Claims, 10 Drawing Sheets

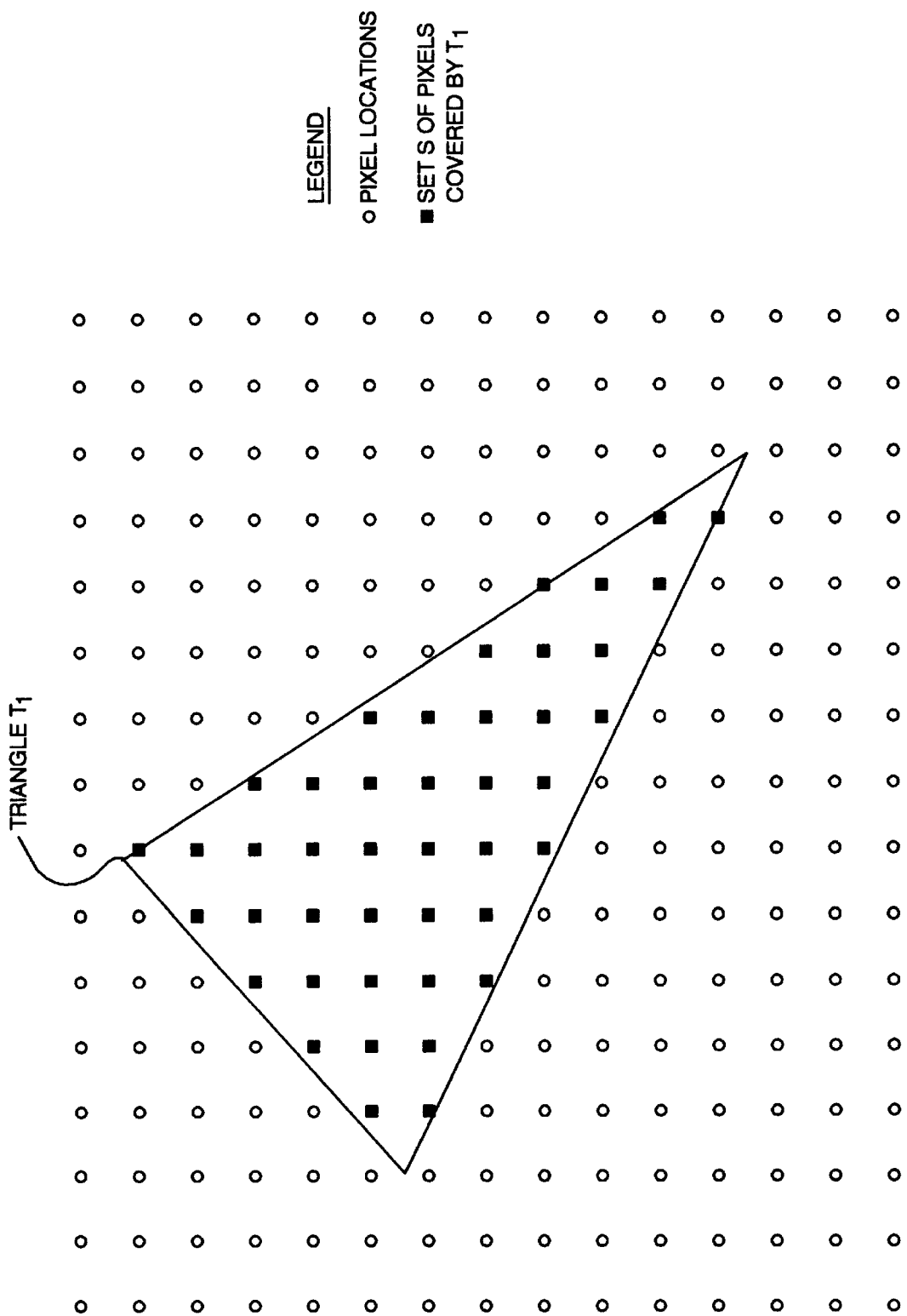

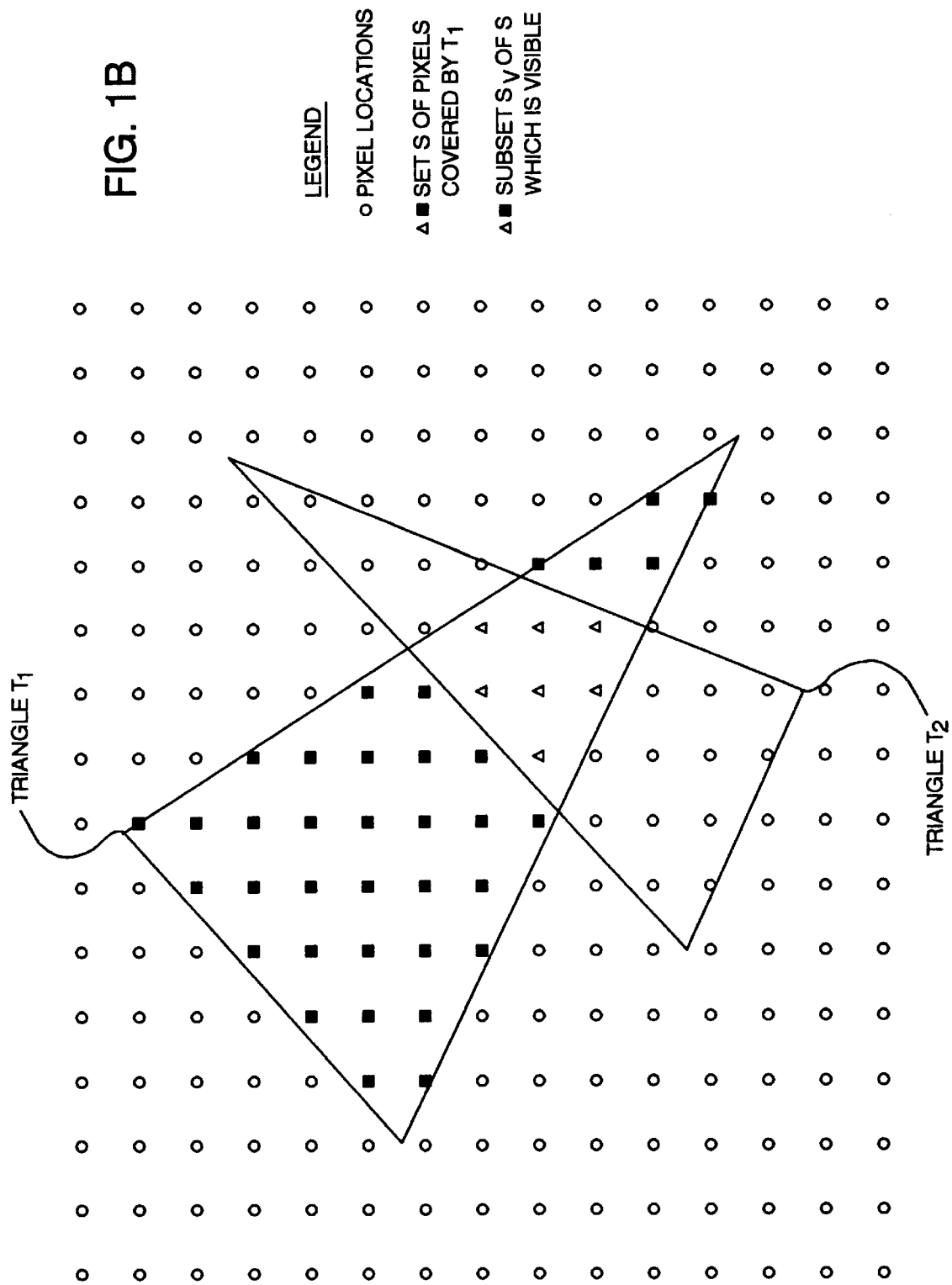

Z BUFFER BANDWIDTH REDUCTIONS VIA SPLIT TRANSACTIONS

BACKGROUND OF THE INVENTION

1. Technical Field

The present invention relates to computer graphics systems, and more specifically, to computer graphics systems that render primitives utilizing at least one frame buffer and Z buffer.

2. Background of the Invention

Computer graphics systems are frequently used to model a scene having three-dimensional objects and display the scene on a two-dimensional display device such as a cathode ray tube or liquid crystal display. Typically, the three-dimensional objects of the scene are each represented by a multitude of polygons (or primitives) that approximate the shape of the object. Rendering the scene for display on the two-dimensional display device is a computationally intensive process. It is therefore frequently a slow process, even with today's microprocessors and graphics processing devices.

Rasterization, which is part of the rendering operation, is the process which converts the simple, geometric description of a graphics primitive into pixels for display. A typical primitive, as shown in FIG. 1A, is a triangle $T_1$. Other area or surface primitives conventionally are converted into one or more triangles prior to rasterization. The triangle $T_1$ is represented by the (x,y,z) coordinates and other properties (such as colors and texture coordinates) at each of its vertices. The (x,y) coordinates of a vertex tell its location in the plane of the display. The z coordinate tells how far the vertex is from the selected view point of the three-dimensional scene. Rasterization may be divided into three tasks: scan conversion, shading, and visibility determination.

Scan conversion utilizes the (x,y) coordinates of the vertices of each triangle to compute a set of pixels S which cover the triangle.

Shading computes the colors of the pixels within the set S. There are numerous schemes for computing colors, some of which involve computationally intensive techniques such as texture mapping.

Visibility determination utilizes the z coordinate, also called the depth value, of each pixel to compute the set of pixels $S_v$ (a subset of S) which are "visible" for the triangle. The set $S_v$ will differ from the set S if any of the pixels in set S cover the previously rasterized triangles whose z values are closer to the selected view point. Thus, for each triangle in the scene, a pixel is "visible" if it is in the set $S_v$, or "hidden" if it is the set S but not in the set $S_v$. Moreover, a triangle is "all visible" if the set $S_v$ is identical to set S, "partially hidden" if the set $S_v$ is not identical to set S and set $S_v$ is not empty, or "all hidden" if set $S_v$ is empty. For example, FIG. 1B shows two triangles, T1 and T2, wherein triangle T1 is partially hidden by triangle T2.

Moreover, the rasterization process may include lighting calculations that simulate the effects of light sources upon the surfaces of the triangles of the scene. Typically, the position of each triangle is identified by (x,y,z) coordinates of a set of three vertices, with each vertex having a reflectance normal vector with the vertex at its origin. The reflectance normal vectors of each triangle along with information about the position of the light sources are used to calculate the effect of the light sources on the color values determined during the shading calculations for each triangle.

Rasterization is completed by writing the colors of the set of visible pixels $S_v$ to a frame buffer for display, and writing the z coordinate of the set of visible pixels $S_v$ to a Z buffer.

The z coordinate of a pixel reflects the distance from the selected viewpoint of the scene. Typically, a larger z coordinate represents a greater distance from the viewpoint. A comparison of the z coordinates of a pixel that covers two triangles determines which triangle is closer to the viewpoint and therefore should appear on the display. The z coordinate of each pixel that covers a triangle may be determined by interpolation between the z coordinates specified for the vertices of the triangle. In z buffer systems, as the z coordinate (Znew) of the pixels covered by a given primitive are generated, Znew is compared to the z coordinate (Zold) previously stored in the z buffer. Typically, before processing the first triangle of a scene, the z buffer entries associated with each pixel is initialized by storing a value corresponding to a maximum distance (Zmax), such that initially Zold corresponds to Zmax. The z buffer comparison test used may vary depending upon the design of the system and/or the current z buffer comparison condition. In one approach, if Znew is less than Zold (indicating the pixel that covers the current triangle is closer to the viewpoint than those triangles processed prior to the current triangle), then the current pixel is visible and the z buffer entry corresponding to the pixel is updated to contain Znew. If Znew is greater than or equal to Zold, (indicating the pixel that covers the current triangle is equidistant to or further from the viewpoint than those triangles processed prior to the current triangle), then the current pixel is not visible and the z buffer entry corresponding to the pixel remains unchanged.

For interactive 3D graphics, the memory bandwidth requirements of the frame buffer and Z buffer necessitate very fast memories and pose significant challenges. For example, the Z buffer may be required to be cleared and updated at 20–30 Hz for interactive applications. Consider a graphics system having a frame buffer and Z buffer each storing 3.75 MB of data for output to a high resolution display (for example, 1280 pixels×1024 pixels). In this scenario, the 20–30 Hz refresh of the Z buffer requires a bandwidth of 93.75 MB/second. In addition, during each frame, visibility determination is required for the incoming pixels. Assume for example that the target rendering rate is 1 million pixels/second with an average of 50 pixels per polygon. This results in a pixel throughput of 50 million pixels/second. In this case, the read component of the Z buffer bandwidth is 50M*3=150 MB/sec. Furthermore, assume an average depth complexity of 2. In this case, the write component of the Z buffer bandwidth is 50M*3*(½) =75 MB/second. Thus, the overall required Z buffer bandwidth is 93.75+150+75=318.75 MB/second, which is quite high. For example, the bandwidth of the PCI standard bus of a personal computer is 132 MB/second.

Thus far, proposed solutions that satisfy the Z buffer bandwidth requirements for interactive applications have focused on enhanced memory architectures that improve the access time of the memory, and thus can meet such high Z buffer bandwidth requirements. For example, K. Suizu et al., "Emerging Memory Solutions for Graphics Applications", IEICE Transactions on Electronics, July 1995, pg. 773–781, discusses various memory architectures (such as the VRAM, DRAM EDO and SDRAM architectures) that may be used in graphics systems. However, such solutions are costly to implement because of the complex logic, large chip area and multiple I/O pins associated with such solutions.

Other proposed solutions that satisfy the Z buffer bandwidth requirements for interactive applications have focused on interleaving memory banks. For example, Foley et. al., "Computer Graphics: Principles and Practice", pp. 890–899 (2nd Ed. 1990), herein incorporated by reference in its entirety, discloses systems that partition the pixels of scan lines into subsets. The rasterization of the pixels for each subset is performed by a dedicated processor/memory subsystem. The pixel data is read from the memory subsystems to construct the image for display. However, this solution is costly because of the complex logic and chip area required for the multiple processor/memory subsystems.

Thus, there remains a need in the art for solutions that satisfy the Z buffer bandwidth requirements for interactive applications yet remain cost effective.

SUMMARY OF THE INVENTION

The above-stated problems and related problems of the prior art are solved with the principles of the present invention, Z Buffer Bandwidth Reductions Utilizing Split Transactions. The present invention is utilized in computer graphics systems wherein objects are represented by one or more primitives and wherein pixel data associated with a plurality of pixels represents a view of the objects. The present invention is a method and corresponding apparatus for identifying whether a given primitive is visible at the plurality of pixels. The method and apparatus store, for each pixel P of the plurality of pixels, a depth value $Z_{old}$ associated with the pixel P in a buffer entry, wherein $Z_{old}$ comprises a plurality of portions including a most significant portion and at least one less significant portion. A set of pixels of the plurality of pixels that cover the given primitive is determined. For each pixel Q within the set of pixels, a depth value $Z_{new}$ of the given primitive at the pixel Q is computed, wherein the computed depth value $Z_{new}$ comprises a plurality of portions including a most significant portion and at least one less significant portion, and wherein the portions of the computed depth value $Z_{new}$ correspond to the portions of the stored depth values. In addition, the most significant portion of the depth value $Z_{old}$ of the pixel Q stored in the buffer entry associated with the pixel Q is fetched. Then, the most significant portion of the depth value $Z_{old}$ of the pixel Q is compared to the most significant portion of the computed depth value $Z_{new}$ of the pixel Q to determine if one of three conditions is satisfied:

a) the given primitive is visible at the pixel Q, b) the given primitive is hidden at the pixel Q, and c) it is undetermined whether the given primitive is either visible or hidden at the pixel Q.

If condition a) is satisfied, the buffer entry associated with the pixel Q is updated to store the computed depth value $Z_{new}$. If condition b) is satisfied, the processing ends with respect to the pixel Q. And if condition c) is satisfied, then the fetching and comparing operation is repeated for the next less significant portion of the depth values $Z_{old}$ and $Z_{new}$ until the least significant portion of the depth values $Z_{old}$ and $Z_{new}$ has been processed.

By performing the above operations, in most instances the z compare operation may be resolved by analyzing only the most significant portions of the $Z_{old}$ and $Z_{new}$ value associated with a pixel. In few instances, the lesser significant portion of the $Z_{old}$ and $Z_{new}$ may be required to be analyzed to resolve the compare operation. Advantageously, this results in an overall reduction of the z buffer bandwidth requirement for the system.

BRIEF DESCRIPTION OF THE DRAWINGS

FIG. 1(A) is a pictorial representation of the rasterization of a triangle T1.

FIG. 1(B) is a pictorial representation of the rasterization of triangles T1 and T2, wherein triangle T1 is partially hidden by triangle T2.

DETAILED DESCRIPTION OF THE PREFERRED EMBODIMENTS

Figure 2:
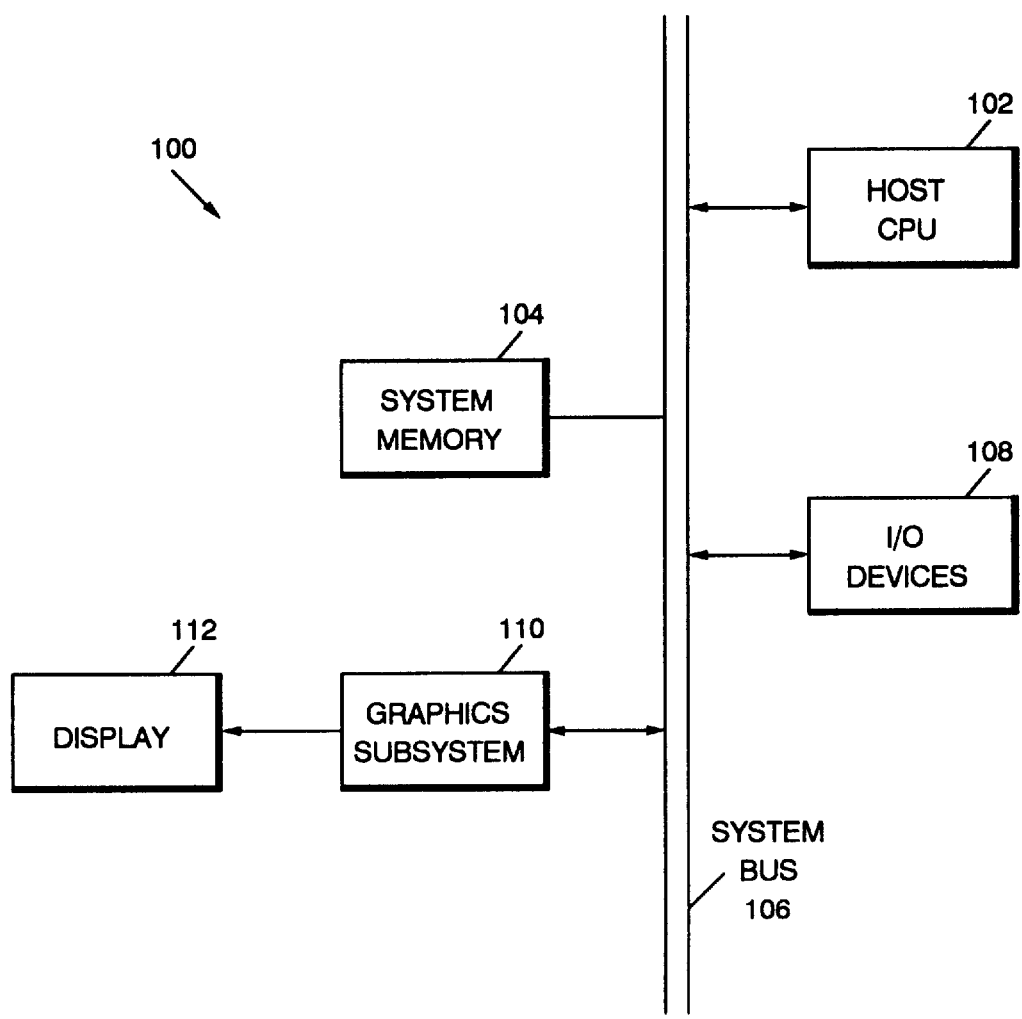
FIG. 2 is a functional block diagram of a computer graphics system.

As shown in FIG. 2, a conventional graphics system 100 includes a host processor 102 which is coupled to a system memory 104 via a system bus 106. The system memory 104 consists of random access memory (RAM) that stores graphics data defining the objects contained in one or more three dimensional models. The graphics data that defines each object consists of coordinates and attributes (e.g. color, reflectance, texture) of primitives. The primitives are geometric entities such as a polygon, line or surface. Typically, the primitives are triangles defined by the coordinates of three vertices. In this case, the system memory 104 includes an ordered list of vertices of the triangles that define the surfaces of objects that make up a three dimensional scene. In addition, the system memory 104 may store a list of triangle identifiers that correspond to each of the triangles and transformation matrices that specify how the triangles are situated and oriented in the scene. Input/output (I/O) devices 108 interface to the host processor 102 via the system bus 106. The I/O devices may include a keyboard, template or touch pad for text entry, a pointing device such as a mouse, trackball, Spaceball or light pen for user input, and non-volatile storage such as a hard disk or CD-ROM for storing the graphics data and any application software. As is conventional, the graphics data and application software is loaded from the non-volatile storage to the system memory 104 for access by the host processor 102.

Figure 3:
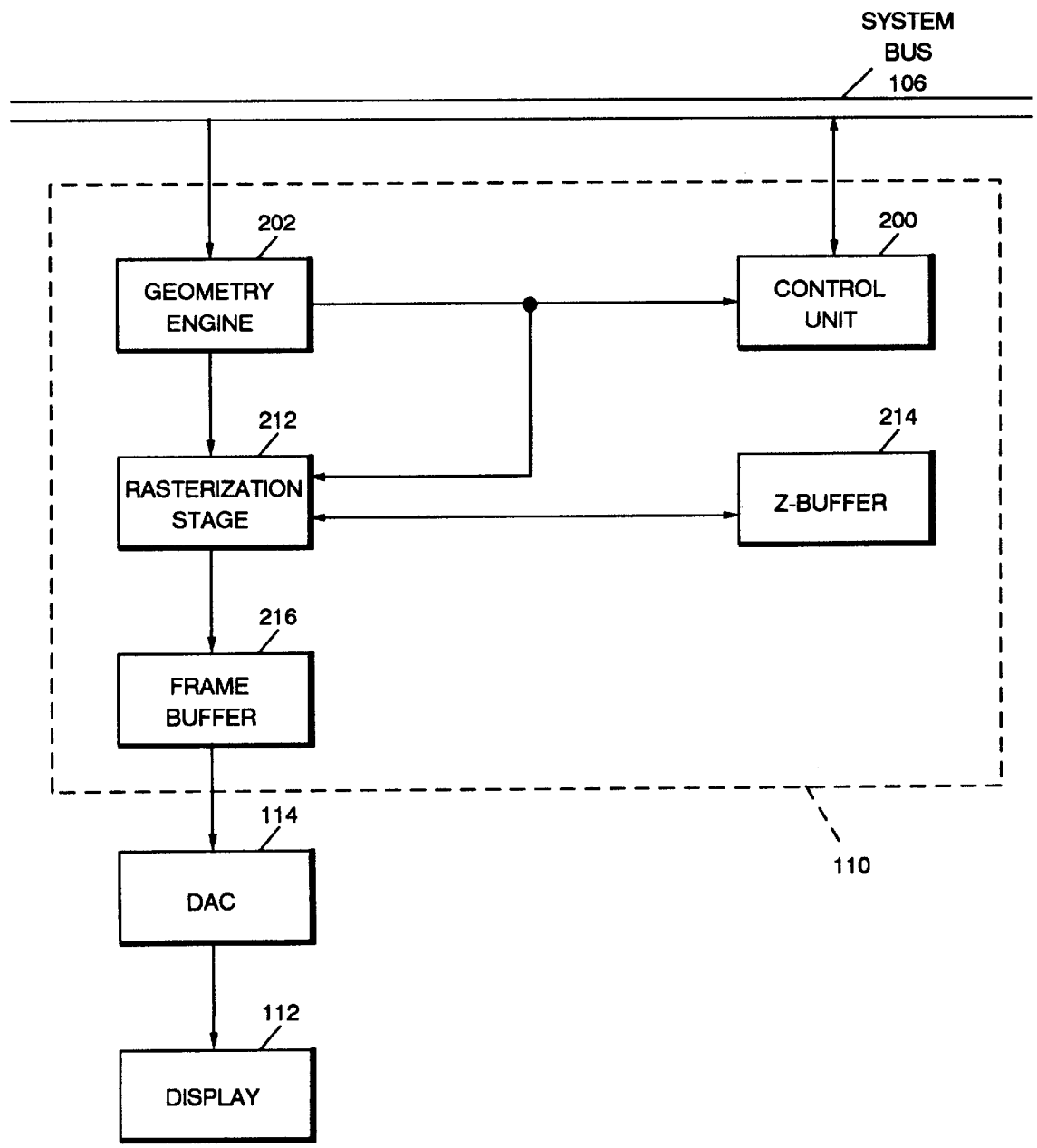
FIG. 3 is a functional block diagram of the graphics subsystem of the computer graphics system of FIG. 1.

The graphics system 100 also includes a graphics subsystem 110 that interfaces to the system memory 104 via the system bus 106. Generally, the graphics subsystem 110 operates to render the graphics data stored in the system memory 104 for display on a display area of a display device 112 according to graphics orders transferred from the host processor 102 to the graphics subsystem 110. The display device 112 may utilize raster scan techniques or liquid crystal display techniques to display the pixels. The pixel data generated by the graphics subsystem 110 is in digital form. Typically, the display device 112 requires the pixel data in analog form. In this case, as shown in FIG. 3, a digital-to-analog converter 114 may be placed between the graphics subsystem 110 and the display device 112 to convert the pixel data from a digital to an analog form.

The graphics orders typically are generated by application software that are stored in the system memory 104 and executed by the system processor 102. The graphics orders typically consist of a sequence of data blocks that include, or point to, the graphics data (e.g. coordinates and attributes of one or more objects) that defines the objects of the scene, associated transformation matrices, and any other necessary information required by the graphics subsystem 110. The primitives associated with the graphics orders are typically defined by the value of the geometric coordinates or homogeneous coordinates for each vertex of the primitive. In addition, graphics orders typically include, or point to, data defining the reflectance normal vectors for the vertices of each primitive. The values of these coordinates and normal vectors are assumed to be specified in a coordinate system designated as the model coordinate system.

Although the graphics subsystem 110 is illustrated as part of a graphics work station, the scope of the present invention is not limited thereto. Moreover, the graphics subsystem 110 of the present invention as described below may be implemented in hardware such as a gate array or a chip set that includes at least one programmable sequencer, memory, at least one integer processing unit and at least one floating point processing unit, if needed. In addition, the graphics subsystem 110 may include a parallel and/or pipelined architecture as shown in U.S. Pat. No. 4,876,644, commonly assigned to the assignee of the present invention and incorporated by reference herein in its entirety.

In the alternative, the graphics subsystem 110 (or portions thereof) as described below may be implemented in software together with a processor. The processor may be a conventional general purpose processor, a part of the host processor 102, or part of a co-processor integrated with the host processor 102.

More specifically, as shown in FIG. 3, the graphics subsystem 110 includes a control unit 200 that supervises the operation of the graphics subsystem 110. Upon receiving a graphics order to render a scene, the control unit 200 passes the graphics data associated with the graphics order on to a geometry engine 202. The geometry engine 202 transforms the graphics data associated with the graphics order from the model coordinate system to a normalized device coordinate system (sometimes referred to as the view coordinate system) and clips the graphics data against a predetermined view volume. Typically, this transformation involves a series of transformations including a modeling transformation from the model coordinate system to a world coordinate system, a view orientation transformation from the world coordinate system to a view reference coordinate system and a view mapping transformation from the view reference coordinate system to the normalized device coordinate system. In addition, the transformation from the model coordinate system to the normalized device may involve a perspective projection or a parallel projection. For example, consider a system wherein the coordinates of the view reference coordinate system are represented as ($X_{eye}$, $Y_{eye}$, $Z_{eye}$). In this case, the perspective projection for the z coordinate $Z_{eye}$ may be computed as follows:

$$Z_{NDC}=(Z_{FAR}+Z_{NEAR})/(Z_{FAR}-Z_{NEAR})+2*Z_{FAR}*Z_{NEAR}/((Z_{FAR}-Z_{NEAR})*Z_{eye})$$

where $Z_{FAR}$ and $Z_{NEAR}$ are the far and near clipping planes.
Similarly, the parallel projection for the z coordinate $Z_{eye}$ may be computed as follows:

$$Z_{NDC}=(Z_{FAR}+Z_{NEAR})/(Z_{FAR}-Z_{NEAR})-(2*Z_{eye})/(Z_{FAR}-Z_{NEAR})$$

where $Z_{FAR}$ and $Z_{NEAR}$ are the far and near clipping planes.
A more detailed description of the geometric transformations performed by the geometry engine 202 may be found in Foley et. al., "Computer Graphics: Principles and Practice", pp. 201–281 (2nd Ed. 1990), and in U.S. patent application Ser. No. 08/586,266, entitled Computer Graphics System Having Efficient Texture Mapping with Perspective Correction, filed Jan. 16, 1996, herein incorporated by reference in their entirety. In addition, depending upon the shading algorithm to be applied, an illumination model is evaluated at various locations (i.e., the vertices of the primitives and/or the pixels covered by a given primitive).

The graphics data generated by the geometry engine, which represents the transformed primitives in the normalized device coordinate system, is then passed on to a rasterization stage 212 that converts the transformed primitives into pixels, and generally stores each primitive's contribution at each pixel in at least one frame buffer 216 and a z buffer 214. The operation of the rasterization stage 212 may be divided into three tasks as described above: scan conversion, shading, and visibility determination. The pixel data is periodically output from the frame buffer 216 for display on the display device 112. The functionality of the geometry engine 202 and rasterization stage 212 may be organized in a variety of architectures. A more detailed discussion of such architectures may be found in Foley et. al., "Computer Graphics: Principles and Practice", pp. 855–920 (2nd Ed. 1990), herein incorporated by reference in its entirety.

The frame buffer 216 typically stores pixel data that represents the color of each pixel of the display area of the display device 112. In the alternative, the pixel data stored in the frame buffer 216 may be scaled up or down to satisfy the resolution of the display area of the display device. The description below assumes that the frame buffer 216 stores pixel data that represents the color of each pixel of the display area of the display device 112. The pixel data is periodically output from the frame buffer 216 for display in the display area of the display device 112.

In addition, the graphics subsystem 110 may include more than one frame buffer. As is conventional, one of the frame buffers serves as the active display portion, while another one of the frame buffers may be updated for subsequent display. Any one of the frame buffers may change from being active to inactive in accordance with the needs of the system; the particular manner in which the changeover is accomplished is not relevant to the present invention.

Figure 6:
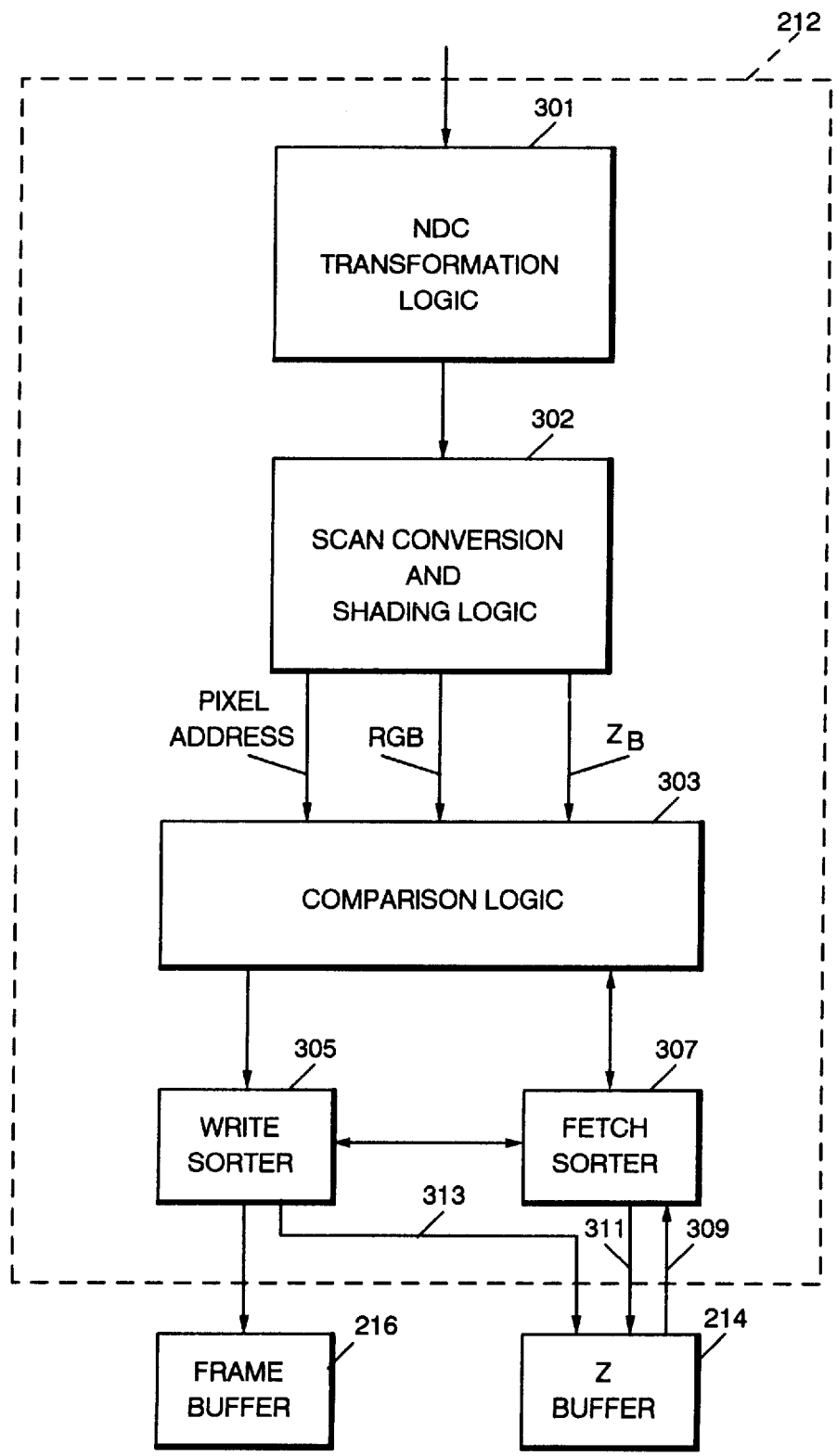
FIG. 6 is a functional block diagram of the rasterization stage of the graphics subsystem of FIG. 2 according to the present invention.

According to the present invention, as shown in FIG. 6, the rasterization stage 212 includes comparison logic 303, a write sorter 305 (that interfaces to the frame buffer 216 and the Z buffer 214), and a fetch sorter 307 (that interfaces to the Z buffer 214) that operate cooperatively to perform the visibility determination task of the rasterization stage 212. More specifically, the rasterization stage 212 of the present invention preferably includes transformation logic 301 that maps the normalized device coordinates ($X_{NDC}$, $Y_{NDC}$, $Z_{NDC}$), which are typically floating point numbers, of the vertices of each primitive output from the geometry engine 202 to an integer based window coordinate system ($X_W$, $Y_W$, $Z_B$). The mapping typically includes a scaling and translate operation which are described in more detail in Foley et. al., "Computer Graphics: Principles and Practice", pg. 278 (2nd Ed. 1990), herein incorporated by reference in its entirety. Preferably, the transformation logic 301 generates the transformed depth value $Z_B$ as follows:

$$Z_B=(Z_{NDC}+1)/2*2^{ZBITS}$$

where ZBITS represents the width of the Z buffer entry corresponding to a given pixel.

For example, ZBITS may be 24 (or 3 bytes). In this case, an example of the mapping of $Z_{eye}$ to $Z_{NDC}$ to $Z_B$ is illustrated in the following table. In the table, $Z_{eye}$ is bounded by two planes, $Z_{NEAR}=10.0$ and $Z_{FAR}=1000000.0$, which are reasonable approximations to zero and infinity. For example, the units could be centimeters indicating that the closest object is at least 10 cm away and the farthest object to be viewed is 10 Km away in a real world situation.

| $Z_B$ | $Z_{eye}$ | $Z_B$ | $Z_{eye}$ |
|---|---|---|---|
| 0 | −10.000000 | 800000 | −19.999802 |
| 10000 | −10.039215 | 810000 | −20.157276 |
| 20000 | −10.078739 | 820000 | −20.317251 |
| 30000 | −10.118576 | 830000 | −20.479786 |
| 40000 | −10.158729 | 840000 | −20.644943 |
| 50000 | −10.199202 | 850000 | −20.812784 |
| 60000 | −10.239998 | 860000 | −20.983377 |
| 70000 | −10.281121 | 870000 | −21.156790 |
| 80000 | −10.322577 | 880000 | −21.333094 |
| 90000 | −10.364368 | 890000 | −21.512358 |
| a0000 | −10.406500 | 8a0000 | −21.694662 |
| b0000 | −10.448975 | 8b0000 | −21.880083 |
| c0000 | −10.491798 | 8c0000 | −22.068701 |
| d0000 | −10.534974 | 8d0000 | −22.260597 |
| e0000 | −10.578506 | 8e0000 | −22.455862 |
| f0000 | −10.622400 | 8f0000 | −22.654581 |
| 100000 | −10.666659 | 900000 | −22.856850 |
| 110000 | −10.711289 | 910000 | −23.062763 |
| 120000 | −10.756294 | 920000 | −23.272421 |
| 130000 | −10.801679 | 930000 | −23.485924 |
| 140000 | −10.847448 | 940000 | −23.703381 |
| 150000 | −10.893607 | 950000 | −23.924902 |
| 160000 | −10.940161 | 960000 | −24.150604 |
| 170000 | −10.987114 | 970000 | −24.380604 |
| 180000 | −11.034472 | 980000 | −24.615026 |
| 190000 | −11.082239 | 990000 | −24.854002 |
| 1a0000 | −11.130423 | 9a0000 | −25.097662 |
| 1b0000 | −11.179026 | 9b0000 | −25.346148 |
| 1c0000 | −11.228056 | 9c0000 | −25.599602 |
| 1d0000 | −11.277518 | 9d0000 | −25.858177 |
| 1c0000 | −11.327418 | 9e0000 | −26.122030 |
| 1f0000 | −11.377762 | 9f0000 | −26.391321 |
| 200000 | −11.428555 | a00000 | −26.666225 |
| 210000 | −11.479804 | a10000 | −26.946915 |
| 220000 | −11.531514 | a20000 | −27.233576 |
| 230000 | −11.583692 | a30000 | −27.526402 |
| 240000 | −11.636345 | a40000 | −27.825594 |
| 250000 | −11.689478 | a50000 | −28.131361 |
| 260000 | −11.743099 | a60000 | −28.443922 |
| 270000 | −11.797214 | a70000 | −28.763508 |
| 280000 | −11.85183 | a80000 | −29.090357 |
| 290000 | −11.906954 | a90000 | −29.424719 |
| 2a0000 | −11.962593 | aa0000 | −29.766857 |
| 2b0000 | −12.018755 | ab0000 | −30.117044 |
| 2c0000 | −12.075446 | ac0000 | −30.475571 |
| 2d0000 | −12.132675 | ad0000 | −30.842733 |
| 2e0000 | −12.190450 | ac0000 | −31.218853 |
| 2f0000 | −12.248776 | af0000 | −31.604259 |
| 300000 | −12.307664 | b00000 | −31.999300 |
| 310000 | −12.367121 | b10000 | −32.404343 |
| 320000 | −12.427155 | b20000 | −32.819767 |
| 330000 | −12.487774 | b30000 | −33.245983 |
| 340000 | −12.548987 | b40000 | −33.683418 |
| 350000 | −12.610805 | b50000 | −34.132515 |
| 360000 | −12.673233 | b60000 | −34.593746 |
| 370000 | −12.736283 | b70000 | −35.067619 |
| 380000 | −12.799964 | b80000 | −35.554653 |
| 390000 | −12.864285 | b90000 | −36.055405 |
| 3a0000 | −12.929255 | ba0000 | −36.570461 |
| 3b0000 | −12.994884 | bb0000 | −37.100449 |
| 3c0000 | −13.061185 | bc0000 | −37.646023 |
| 3d0000 | −13.128164 | bd0000 | −38.207882 |
| 3c0000 | −13.195834 | be0000 | −38.786766 |
| 3d0000 | −13.264205 | bf0000 | −39.383465 |
| 400000 | −13.333289 | c00000 | −39.998810 |
| 410000 | −13.403096 | c10000 | −40.633682 |
| 420000 | −13.473638 | c20000 | −41.289040 |
| 430000 | −13.544926 | c30000 | −41.965881 |
| 440000 | −13.616972 | c40000 | −42.665283 |
| 450000 | −13.689789 | c50000 | −43.388390 |
| 460000 | −13.763390 | c60000 | −44.136433 |
| 470000 | −13.837785 | c70000 | −44.910721 |
| 480000 | −13.912990 | c80000 | −45.712662 |
| 490000 | −13.989016 | c90000 | −46.543766 |
| 4a0000 | −14.065877 | ca0000 | −47.405643 |
| 4b0000 | −14.143588 | cb0000 | −48.300049 |
| 4c0000 | −14.222162 | cc0000 | −49.228851 |
| 4d0000 | −14.301615 | cd0000 | −50.194073 |
| 4e0000 | −14.381960 | ce0000 | −51.197903 |
| 4f0000 | −14.463213 | cf0000 | −52.242702 |
| 500000 | −14.545388 | d00000 | −53.331036 |
| 510000 | −14.628504 | d10000 | −54.465679 |
| 520000 | −14.712575 | d20000 | −55.649647 |
| 530000 | −14.797617 | d30000 | −56.886238 |
| 540000 | −14.883649 | d40000 | −58.179031 |
| 550000 | −14.970686 | d50000 | −59.531952 |
| 560000 | −15.058747 | d60000 | −60.949295 |
| 570000 | −15.147851 | d70000 | −62.435768 |
| 580000 | −15.238016 | d80000 | −63.996563 |
| 590000 | −15.329260 | d90000 | −65.637398 |
| 5a0000 | −15.421603 | da0000 | −67.364578 |
| 5b0000 | −15.515066 | db0000 | −69.185120 |
| 5c0000 | −15.609669 | dc0000 | −71.106789 |
| 5d0000 | −15.705432 | dd0000 | −73.138268 |
| 5e0000 | −15.802378 | de0000 | −75.289230 |
| 5f0000 | −15.900528 | df0000 | −77.570541 |
| 600000 | −15.999905 | e00000 | −79.994431 |
| 610000 | −16.100531 | e10000 | −82.574684 |
| 620000 | −16.202431 | e20000 | −85.326942 |
| 630000 | −16.305630 | e30000 | −88.268990 |
| 640000 | −16.410152 | e40000 | −91.421165 |
| 650000 | −16.516022 | e50000 | −94.806816 |
| 660000 | −16.623266 | e60000 | −98.452873 |
| 670000 | −16.731915 | e70000 | −102.390587 |
| 680000 | −16.841991 | e80000 | −106.656410 |
| 690000 | −16.953526 | e90000 | −111.293129 |
| 6a0000 | −17.066547 | ea0000 | −116.351326 |
| 6b0000 | −17.181086 | eb0000 | −121.891190 |
| 6c0000 | −17.297171 | ec0000 | −127.984978 |
| 6d0000 | −17.414837 | ed0000 | −134.720123 |
| 6e0000 | −17.534115 | ec0000 | −142.203522 |
| 6f0000 | −17.655037 | ef0000 | −150.567169 |
| 700000 | −17.777639 | f00000 | −159.976120 |
| 710000 | −17.901957 | f10000 | −170.639389 |
| 720000 | −18.028025 | f20000 | −182.825699 |
| 730000 | −18.155882 | f30000 | −196.886459 |
| 740000 | −18.285563 | f40000 | −213.290176 |
| 750000 | −18.417112 | f50000 | −232.675705 |
| 760000 | −18.550568 | f60000 | −255.937347 |
| 770000 | −18.685970 | f70000 | −284.366791 |
| 780000 | −18.823364 | f80000 | −319.901306 |
| 790000 | −18.962793 | f90000 | −365.584869 |
| 7a0000 | −19.104305 | fa0000 | −426.489807 |
| 7b0000 | −19.247944 | fb0000 | −511.744324 |
| 7c0000 | −19.393759 | fc0000 | −639.598938 |
| 7d0000 | −19.541800 | fd0000 | −852.617676 |
| 7c0000 | −19.692118 | fe0000 | −1278.384033 |
| 7f0000 | −19.844767 | ff0000 | −2553.518799 |

In addition, the rasterization stage 212 includes scan conversion and shading logic 302 that determines the set of pixels which cover a given primitive, and computes RGB color data, alpha blending data A (if need be), and the depth value $Z_B$ of the given primitive at the pixels within the set. As is conventional, the RGBA data and depth value $Z_B$ of the given primitive at the pixels within the set is preferably determined by interpolating the corresponding data values at the vertices of the given primitive. A more detailed description of the scan conversion operation performed by the scan conversion and shading logic 302 may be found in Foley et. al., "Computer Graphics: Principles and Practice", pp.

945–965 (2d edition 1990), herein incorporated by reference in its entirety. In addition, a more detailed description of the shading operation performed by the scan conversion and shading logic may be found in Foley et. al., "Computer Graphics: Principles and Practice", pp. 734–741 (2d edition 1990), herein incorporated by reference in its entirety.

The scan conversion and shading logic 302 supplies to comparison logic 303 a pixel address which identifies one or more pixels within the set of pixels that cover the given primitive, in addition to the RGBA data and $Z_B$ data of the given primitive at the one or more pixels identified by the accompanying pixel address. The comparison logic 303, together with the write sorter 305 and fetch sorter 307, perform the visibility determination task of the rasterization stage 212 for the given primitive for the one or more pixels identified by the accompanying pixel address. A more detailed description of the operation of the comparison logic 303, write sorter 305, and fetch sorter 307 is set forth below.

Figure 4:
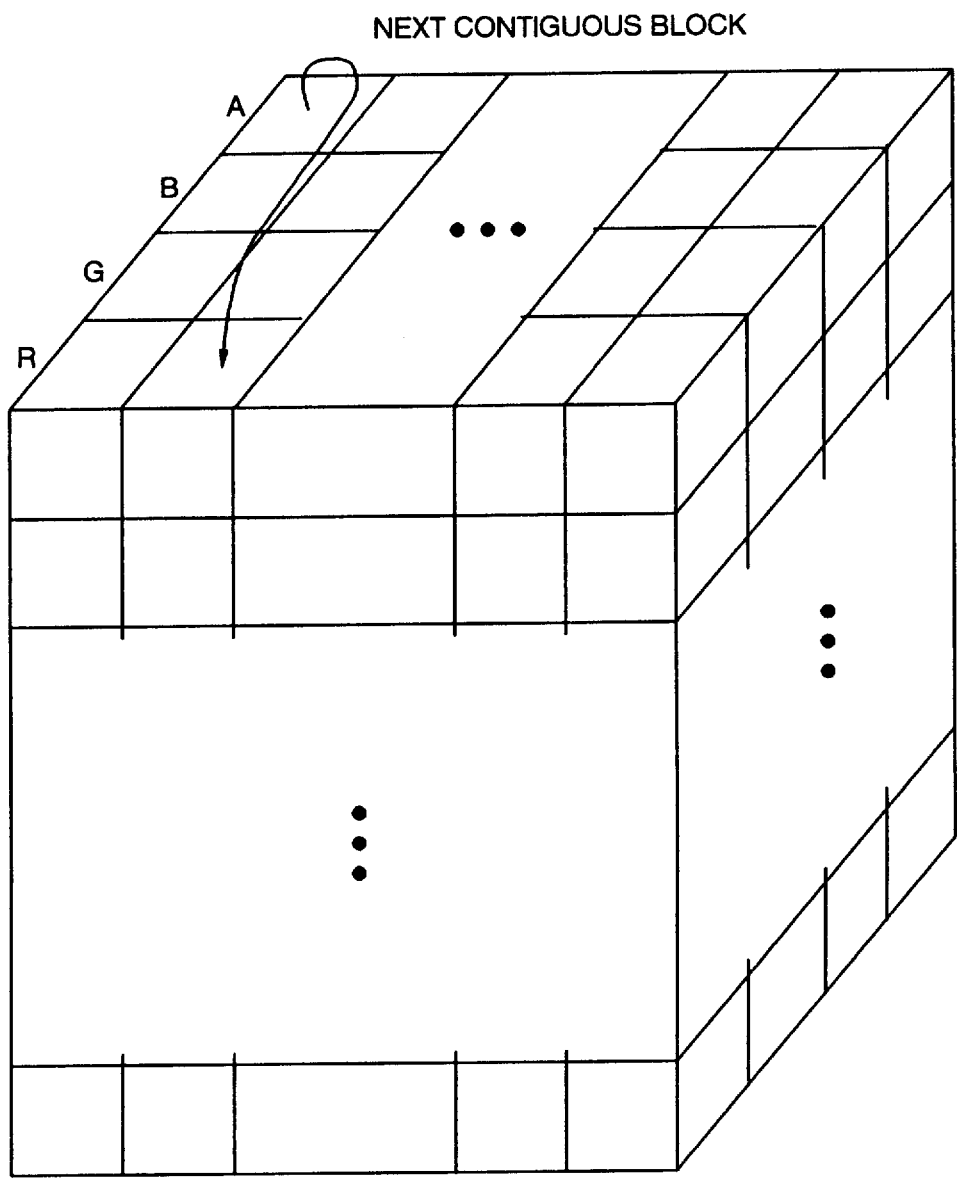
FIG. 4 is a pictorial illustration of the organization of the frame buffer of the graphics subsystem of FIG. 2 according to the present invention.

The frame buffer 216 preferably stores RGB color data and alpha blending data A, if need be, for each pixel in the display area of the display device 112. Preferably, the color data and alpha blending data of a given pixel is stored in contiguous blocks R|G|B|A of the frame buffer 216 as shown in FIG. 4. For example, the color and alpha blending data of a pixel A may be stored in four contiguous bytes RA|BA|GA|AA in the frame buffer 216. In addition, the RGB color data and alpha blending data A of consecutive pixels in the display area of the display device 112 are preferably stored in contiguous blocks of the frame buffer 216 as shown in FIG. 4. For the sake of this description, consecutive pixels are adjacent to one another in the order of the rasterization scheme. For example, consecutive pixels may represent a horizontal line, a vertical line, or a square block. Because a horizontal order is assumed by many rasterization schemes, a horizontal order will be assumed in the description below. To further illustrate the organization of the frame buffer 216, consider four consecutive pixels A, B, C, and D each represented by four contiguous bytes of data R|G|B|A. In this scenario, the color data RGB and alpha blending data A of the four consecutive pixels A,B,C,D would be represented by sixteen contiguous bytes (or four words) RA|BA|GA|AA|RB|BB|GB|AB|RC|BC|GC|AC|RD|BD|GD|AD in the frame buffer 216.

The Z buffer 214 stores the depth value $Z_B$ of the visible primitive for each pixel of the display area of the display device 112. The depth value $Z_B$ of the visible primitive at each pixel is segmented into portions $Z_N, Z_{N-1}, \ldots Z_1, Z_0$. For example, the depth value $Z_B$ of the visible primitive at each pixel may be segmented into byte portions. In this example, if the width of the Z buffer entry corresponding to a given pixel is three bytes (i.e., ZBITS=24), the depth value $Z_B$ of the visible primitive for each pixel may be segmented into three portions each one byte long. In this example, the depth value $Z_B$ of the visible primitive at a pixel A may be segmented into three byte portions ZA2,ZA1,ZA0 where ZA2 is the most significant byte, ZA1 is the next significant byte, and ZA0 is the least significant byte.

The comparison logic 303, together with the write sorter 305 and fetch sorter 307, perform the visibility determination task of the rasterization stage 212 for a primitive P for one or more pixels that cover the primitive P. More specifically, the comparison logic 303 receives from the scan conversion and shading logic 302 a pixel address which identifies one or more pixels that cover the primitive P in addition to the RGBA data and $Z_B$ data corresponding to the color and depth of the primitive P at the one or more pixels. For each of the one or more pixels that cover the primitive P, the comparison logic 303 requests that the fetch sorter 307 fetch from the Z buffer 214 the most significant portion of the depth value $Z_B$ that is associated with the given pixel, denoted $ZOLD_N$. The comparison logic 303 then compares $ZOLD_N$ to the most significant portion of the depth value $Z_B$ of the primitive P at the given pixel, denoted $ZNEW_N$, which was supplied by the scan conversion and shading logic 302, to determine if the most significant portions $ZOLD_N$ and $ZNEW_N$ indicate that the primitive P is visible at the given pixel.

If the most significant portions $ZOLD_N$ and $ZNEW_N$ indicate that the primitive P is visible (for example, when $ZNEW_N<ZOLD_N$), then comparison logic 303 sends the pixel address along with the RGBA color data and depth value $Z_B$ of the primitive P at the given pixel to the write sorter 305. The write sorter 305 writes the RGBA color data to the entry of the frame buffer 216 that corresponds to the supplied pixel address, and writes the depth value $Z_B$ to the entry of the z buffer 214 that corresponds to the supplied pixel address.

If the most significant portions $ZOLD_N$ and $ZNEW_N$ indicate that the primitive P is hidden (for example, when $ZNEW_N>ZOLD_N$), then the operation of the comparison logic 303 ends with respect to the given pixel.

However, If the most significant portions $ZOLD_N$ and $ZNEW_N$ fail to indicate that the primitive P is either visible or hidden (for example, when $ZNEW_N=ZOLD_N$), then the comparison logic 303 requests that the fetch sorter 307 fetch from the Z buffer 214 the next significant portion of the depth value $Z_B$ that is associated with the given pixel, denoted $ZOLD_{N-1}$. The comparison logic 303 then compares $ZOLD_{N-1}$ to the next significant portion of the depth value $Z_B$ of the primitive P at the given pixel, denoted $ZNEW_{N-1}$, which was supplied by the scan conversion and shading logic 302 to determine if the next significant portions $ZOLD_{N-1}$ and $ZNEW_{N-1}$ indicate that the primitive P is visible at the given pixel.

If the next significant portions $ZOLD_{N-1}$ and $ZNEW_{N-1}$ indicate that the primitive P is visible (for example, when $ZNEW_{N-1}<ZOLD_{N-1}$), then comparison logic 303 sends the pixel address along with the RGBA color data and depth value $Z_B$ of the primitive P at the given pixel to the write sorter 305. The write sorter 305 writes the RGBA color data to the entry of the frame buffer 216 that corresponds to the supplied pixel address, and writes the depth value $Z_B$ to the entry of the z buffer 214 that corresponds to the supplied pixel address.

If the next significant portions $ZOLD_{N-1}$ and $ZNEW_{N-1}$ indicate that the primitive P is hidden (for example, when $ZNEW_{N-1}>ZOLD_{N-1}$), then the operation of the comparison logic 303 ends with respect to the given pixel.

However, if the next significant portions $ZOLD_{N-1}$ and $ZNEW_{N-1}$ fail to indicate that the primitive P is either visible or hidden (for example, when $ZNEW_{N-1}=ZOLD_{N-1}$), then the comparison logic 303 performs the same operations for the next significant portion of the depth value $Z_B$ that is associated with the given pixel until all portions of the depth value $Z_B$ that is associated with the given pixel have been processed as described above. After all portions have been processed, the operation of the comparison logic ends with respect to the given pixel.

By performing the above operations, in most instances the comparison logic 303 resolves the z compare operation by analyzing only the most significant portions $ZOLD_N$ and $ZNEW_N$. In few instances, the less significant portions $ZOLD_{N-1}$ and $ZNEW_{N-1}, \ldots$ may be required to be analyzed to resolve the compare operation. Advantageously, this results in an overall reduction of the z buffer bandwidth requirement for the system.

Figure 5:
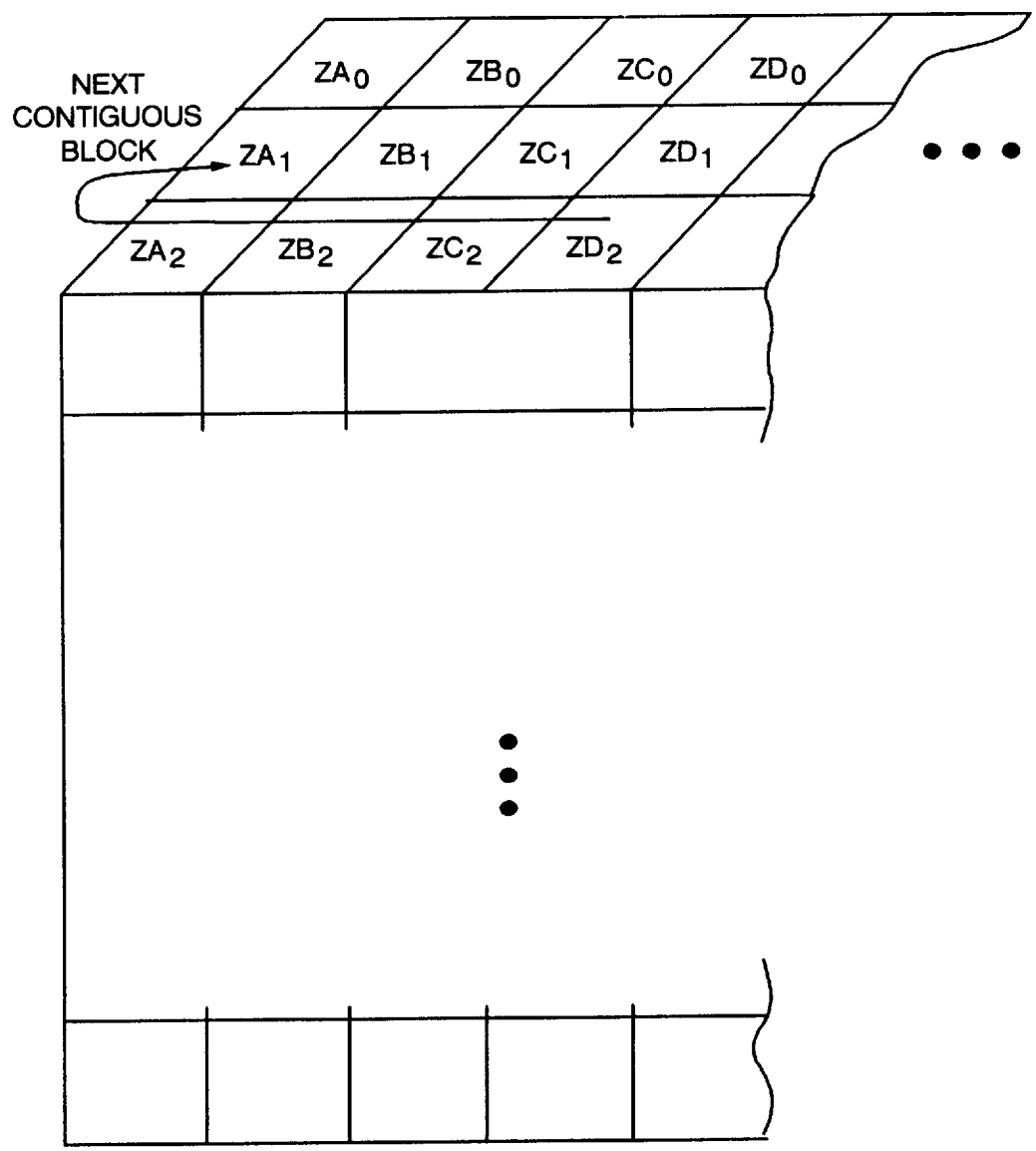
FIG. 5 is a pictorial illustration of the organization of the Z buffer of the graphics subsystem of FIG. 2 according to the present invention.

In an alternative embodiment, the comparison logic 303 may integrate the comparison operations described above for a predetermined number of consecutive pixels. In this embodiment, the Z buffer 214 is preferably organized such that the corresponding portions of the depth value $Z_B$ of the visible primitive at the predetermined number of consecutive pixels are stored in contiguous blocks of the Z buffer 214. For example, consider the scenario presented above wherein pixels A,B,C,D are consecutive pixels each having a depth value $Z_B$ of the visible primitive at that pixel that is 24 bits wide and segmented into three byte portions. Thus, the depth value $Z_B$ of the visible primitive at pixel A is segmented into three byte portions ZA2,ZA1,ZA0, the depth value $Z_B$ of the visible primitive at pixel B is segmented into three byte portions ZB2,ZB1,ZB0, the depth value $Z_B$ of the visible primitive at pixel C is segmented into three byte portions ZC2,ZC1,ZC0, and the depth value $Z_B$ of the visible primitive at pixel D is segmented into three byte portions ZD2,ZD1,ZD0. In this case, the Z buffer 214 may be organized such that the corresponding portions (ZA2, ZB2,ZC2,ZD2 and ZA1,ZB1,ZC1,ZD1 and ZA0,ZB0,ZC0, ZD0) of the depth value $Z_B$ for the visible primitive at the four consecutive pixels are stored in contiguous blocks of the Z buffer 214 as shown in FIG. 5. In this example, a word in the Z buffer 214 contains ZA2|ZB2|ZC2|ZD2, the next contiguous word contains ZA1|ZB1|ZC1|ZD1, and the following contiguous word contains ZA0|ZB0|ZC0|ZD0.

In this alternate embodiment, the comparison logic 303 preferably operates as illustrated in the following pseudo-code:

```
Q0: wait for pixel address, RGBA data and associated Incoming ZB data for pixels A, B, C, D
        Pixel Address A, Pixel Address B, Pixel Address C, Pixel Address D
        RA|BA|GA|AA|RB|BB|GB|AB|RC|BC|GC|AC|RD|BD|GD|AD and
        IZA2|IZA1|IZA0, IZB2|IZB1|IZB0, IZC2|IZC1|IZC0, IZD2|IZD1|IZD0
        j = 2;
L0: request ZAj|ZBj|ZCj|ZDj from fetch sorter
        wait for ZAj|ZBj|ZCj|ZDj from fetch sorter
        /* pixel A */
        if(IZAj<ZAj) {
                        send Pixel Address A, RA|GA|BA|AA and IZA2|IZA1|IZA0
                                to write sorter;
                        }
        else    if(IZAj>ZAj) {
                        do nothing;
                        /* go to pixel B */
                        }
L1:        else        {
                        if(j>0) {
                                request ZAj-1 from fetch sorter
                                }
                        /* later pixel with equal Z wins */
                        else    {
                                send Pixel Address A, RA|GA|BA|AA
                                        to write sorter;
                                }
                        }
        /* pixel B */
        if(IZBj<ZBj) {
                        send Pixel Address B, RB|GB|BB|AB and IZB2|IZB1|IZB0
                                to write sorter;
                        }
        else    if(IZBj>ZBj) {
                        do nothing;
                        /* go to pixel C */
                        }
                else    {
                        if(j>0) {
                                request ZBj-1 from fetch sorter
                                }
                        /* later pixel with equal Z wins */
                        else    {
                                send Pixel Address B and
                                        RB|GB|BB|AB to write sorter;
                                }
                        }
        /* pixel C */
        if(IZCj<ZCj) {
                        send Pixel Address C, RC|GC|BC|AC and IZC2|IZC1|IZC0
                        to write sorter;
                        }
        else    if(IZCj>ZCj) {
                        do nothing;
                        /* goto Pixel D */
                        }
                else    {
                        if(j >0) {
                                request ZCj-1 from fetch sorter
                                }
```

```
                        /* later pixel with equal Z wins */
                    else    {
                            send Pixel Address C and RC|GC|BC|AC
                            to write sorter;
                            }
                    }
        /* pixel D */
        if(IZDj<ZDj) {
                    send Pixel Address D, RD|GD|BD|AD and IZD2|IZD1|IZD0
                    to write sorter;
                    }
        else   if(IZDj>ZDj) {
                            do nothing;
                            /* goto L2 */
                            }
                else        {
                            if(j>0) {
                                    request ZDj-1 from fetch sorter
                                    }
                            /* later pixel with equal Z wins */
                            else    {
                                    send Pixel Address D and RD|GD|BD|AD
                                    to write sorter;
                                    }
                            }
L2:  j=j-1;
     if(j=0)        {
                    go to Q0;
                    }
else                {
                    go to L0;
                    }
```

By performing the above operations, in many instances the comparison logic 303 is performs the z compare operation for the predetermined number of consecutive pixels by analyzing only the most significant portions $ZOLD_N$ and $ZNEW_N$ corresponding to each of the predetermined number of consecutive pixels. In this case, only a single z buffer read operation is required. Advantageously, this results in an overall reduction of the z buffer bandwidth requirement for the system.

In the alternate embodiment of the present invention as described above, the Z buffer 214 is preferably organized such that the corresponding portions of the depth value $Z_B$ of the visible primitive at the predetermined number of consecutive pixels are stored in contiguous blocks of the Z buffer 214 as shown in FIG. 5. In this scenario, the write sorter 305 preferably stores, for each pixel in a set of pixels, pixel address data, RGBA color data and $Z_B$ data associated with the given pixel. The write sorter 305 generates a z buffer write signal that represents, for those portions of the depth value $Z_B$ at the predetermined number of consecutive pixels that are to be updated, the updated portion of the depth value $Z_B$ at the given pixel, and forwards the z buffer write signal to the z buffer 214 via data path 311.

Figure 8A:
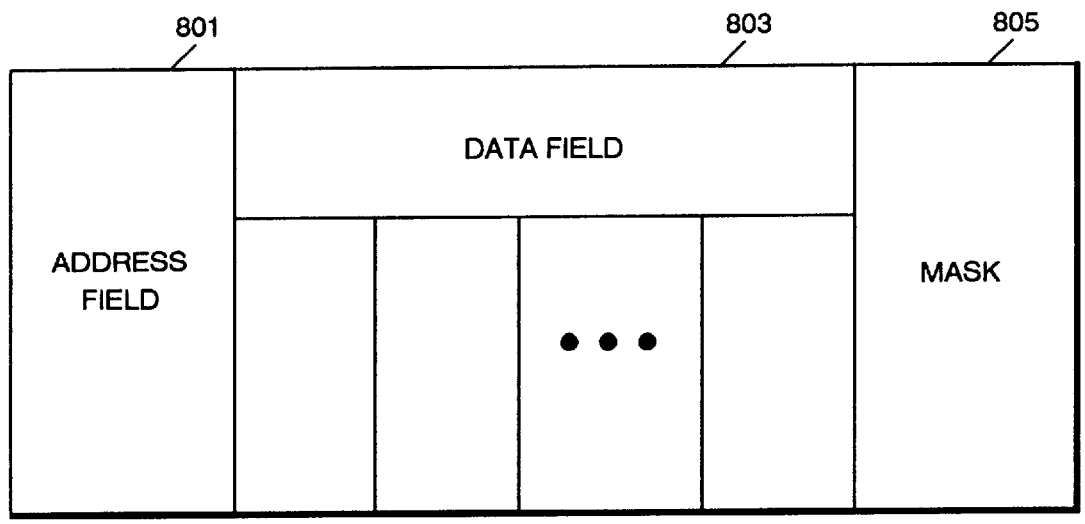
FIGS. 8(A) and (B) illustrate the format of the z buffer write signal according to the present invention.
Figure 8B:
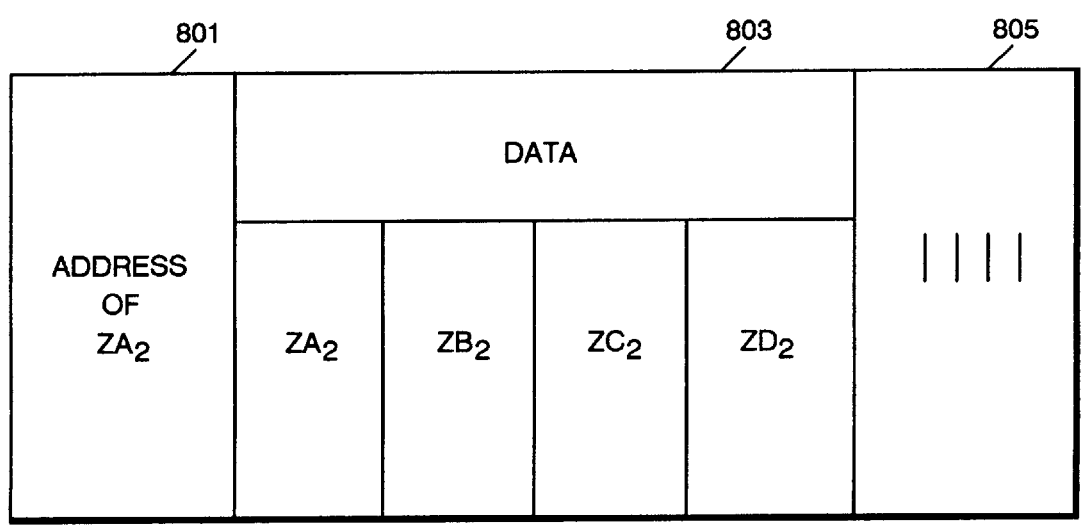

Preferably, the z buffer write signal is sectioned into segments each corresponding to a portion of the depth value $Z_B$ at the predetermined number of consecutive pixels. As shown in FIG. 8(A), each segment preferably includes an address field 801, a data field 803, and a mask 805. The address field 801 identifies, for the given segment, the z buffer entry that holds the portion of the of the depth value $Z_B$ at the predetermined number of consecutive pixels that corresponds to the given segment. The data field 803 includes a plurality of sub-fields each corresponding to one of the predetermined number of consecutive pixels. Each sub-field stores, if need be, the portion of the depth value $Z_B$ that is to be updated at the given pixel. The mask 805 identifies which sub-fields of the data field 803 store updated depth value portion for the predetermined number of consecutive pixels. For example, consider the consider the scenario presented above wherein pixels A,B,C,D are consecutive pixels and the Z buffer 214 contains contiguous entries ZA2|ZB2|ZC2|ZD2, ZA1|ZB1|ZC1|ZD1, and ZA0|ZB0|ZC0|ZD0. In this case, as shown in FIG. 8(B), the segment of the z buffer write signal corresponding to the most significant portion of the consecutive pixels A,B,C,D would include:

1) an address field 801 that identifies the address of the z buffer entry holding ZA2|ZB2|ZC2|ZD2;

2) a data field 803 that includes sub-fields holding the updated most significant portions ZA2,ZB2,ZC2,ZD2 of the depth value $Z_B$ for the consecutive pixels A,B,C,D; and 3) a mask 805 that identifies which sub-fields of the data field 803 store an updated depth value portions for the predetermined number of consecutive pixels.

The mask 805 may include a bits corresponding to each of the sub-fields of the data field 803, wherein the bit being set ('1') indicates that the corresponding sub-field stores an updated depth value portion and the bit being cleared ('0') indicates that the corresponding sub-field does not store an updated depth value portion. For example, the mask may be is set is set to '1111' as shown indicating that all four sub-fields of the data field 803 store an updated depth value portion. The segments of the z buffer write signal that correspond to the less significant portions of the depth value $Z_B$ at the predetermined number of consecutive pixels share this same format.

Upon receiving the Z buffer write signal, the z buffer 214 updates the block(s) of data identified by the pixel address encoded in the write signal. The z buffer 214 preferably updates such block(s) by overwriting only those portion(s) of the block(s) identified by the mask encoded in the signal with the updated portion(s) of such block(s) encoded in the signal. The write sorter 305 in this alternate embodiment preferably operates as illustrated in the following pseudo-code:

```
-------------------------------- writer sorter -------------------------------------------------
W0: while (requests exist in sorter) {
                            send address and RGBA data to frame buffer;
                            sort Z write requests by pixel address;
                            for set of consecutive pixels {
                                    build Z buffer write signal;
                                    send Z buffer write signal to Z buffer
                                                                        }
                            }
    go to W0;
```

As described above, the fetch sorter 307 fetches from the Z buffer 214 the portions of the depth value $Z_B$ that are associated with one or more pixels according to a request supplied by the comparison logic 303. Preferably, the fetch sorter 307 generates a z buffer read signal that identifies one or more pixels and the portion of the depth value $Z_B$ at the one or more pixels that is to be retrieved. The fetch sorter 307 then forwards the z buffer read signal to the z buffer 214 via data path 311. Preferably, the z buffer read signal includes an address field that identifies the z buffer entry that holds the portion of the of the depth value $Z_B$ at the one or more pixels that is to be retrieved. Upon receiving the Z buffer read signal, the z buffer 214 preferably retrieves the Z buffer entry identified by the address field of the z buffer read signal, and forwards the entry to the fetch sorter 307 via data path 309.

In some instances, the portions of the most recent $Z_B$ value of a pixel may not be stored in the Z buffer 214, but may be stored in write sorter 305. Thus, it is necessary that the fetch sorter 307 check whether the correct portion of the $Z_B$ data corresponding to a given pixel is stored in the write sorter 305, and if so grab that portion from the write sorter 305. In this case, the fetch sorter 307 preferably operates as illustrated in the following pseudo-code:

In addition, the present invention as described above may be adapted to perform alpha blending operations. In this case, the frame buffer write operation performed by the write sorter 305 may require a frame buffer read operation that reads the RGBA data of the given pixel stored in the frame buffer and a blending operation that blends the RGB data read from the frame buffer according to the alpha blending data A read from the frame buffer. Alternatively, the frame buffer may perform the such operations internally.

The advantages of the present invention is evident from the following example. Consider the situation presented above where $Z_{eye}$ is bounded by two planes $Z_{NEAR}$=10.0 and $Z_{FAR}$=1000000.0 and wherein $Z_{eye}$ is mapped to $Z_B$ as set forth in the table above. Consider two objects which have $Z_{eye}$ of −500 and −525. The upper byte of the respective $Z_B$ values is 0xFA and 0xFB respectively. In this case, the visibility determination operation can be done by comparing the upper byte and ignoring the two lower bytes. Consider another two objects which have $Z_{eye}$ of −10.85 and −10.90. The upper byte of the respective $Z_B$ values is 0x14 and 0x15 respectively. Again, in this case, the visibility determination operation can be done by comparing the upper byte and ignoring the two lower bytes. Thus, for objects closer to the eye, even small differences can be disambiguated by com-

```
--------------------------------fetch sorter-----------------------------------------------
F0: while (requests exist in sorter) {
                            sort Z fetch requests by pixel address;
                            form mask identifying fetched portions to update;
                            if portion to be updated present in write sorter
                                            {
                                            grab it from
                                            write sorter;
                                            }
                            send z buffer read signal to Z buffer;
                            substitute portions grabbed from write sorter for the
                                    fetched portions;
                            send updated portions identified by mask to
                                    comparison logic;
                            }
    go to F0;
```

The comparison logic 303 of the present invention as described may have a pipelined architecture to reduce the processing time associated with the compare operations for the corresponding Z value portions. In this case, a first stage processes the most significant portions $ZNEW_N$, $ZOLD_N$, and a second stage processes the next significant portions $ZNEW_{N-1}$, $ZOLD_{N-1}$, . . . .

Moreover, the comparison logic 303 of the present invention as described may include prediction logic that predicts the outcome of such compare operations, and controls the fetch sorter 307 to fetch the appropriate data based upon such predictions. In this case, the fetched data may or may not be used depending upon the actual resolution of such compare operations.

paring only the upper byte, and avoiding a compare operation of all three bytes of $Z_B$. If the upper bytes of the two depths match, then the next byte has to be looked at and so on till the least significant byte is reached.

Figure 7A:
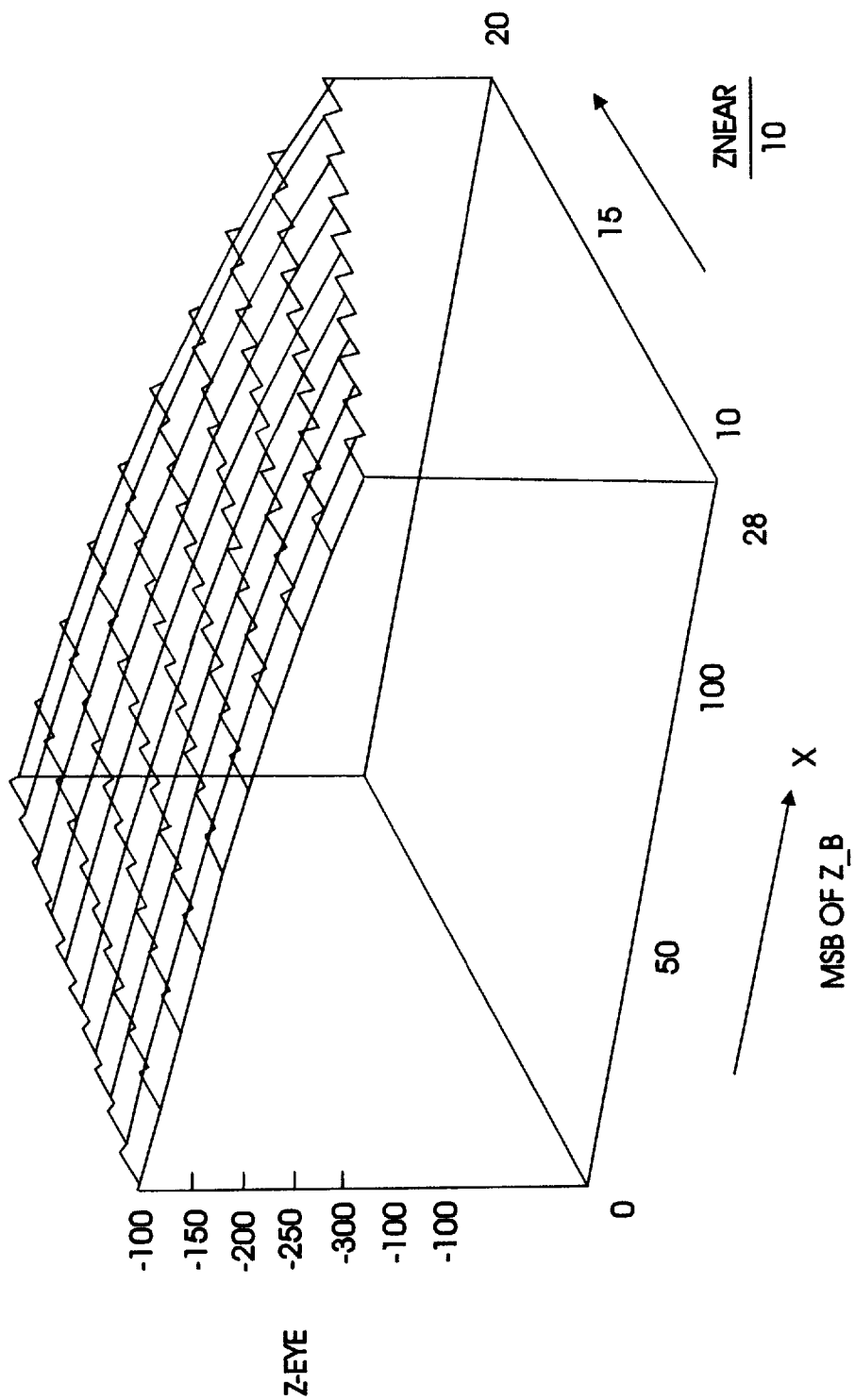
FIGS. 7(A) and (B) are graphs that illustrate the benefits of the present invention for two different Z coordinate mapping schemes.
Figure 7B:
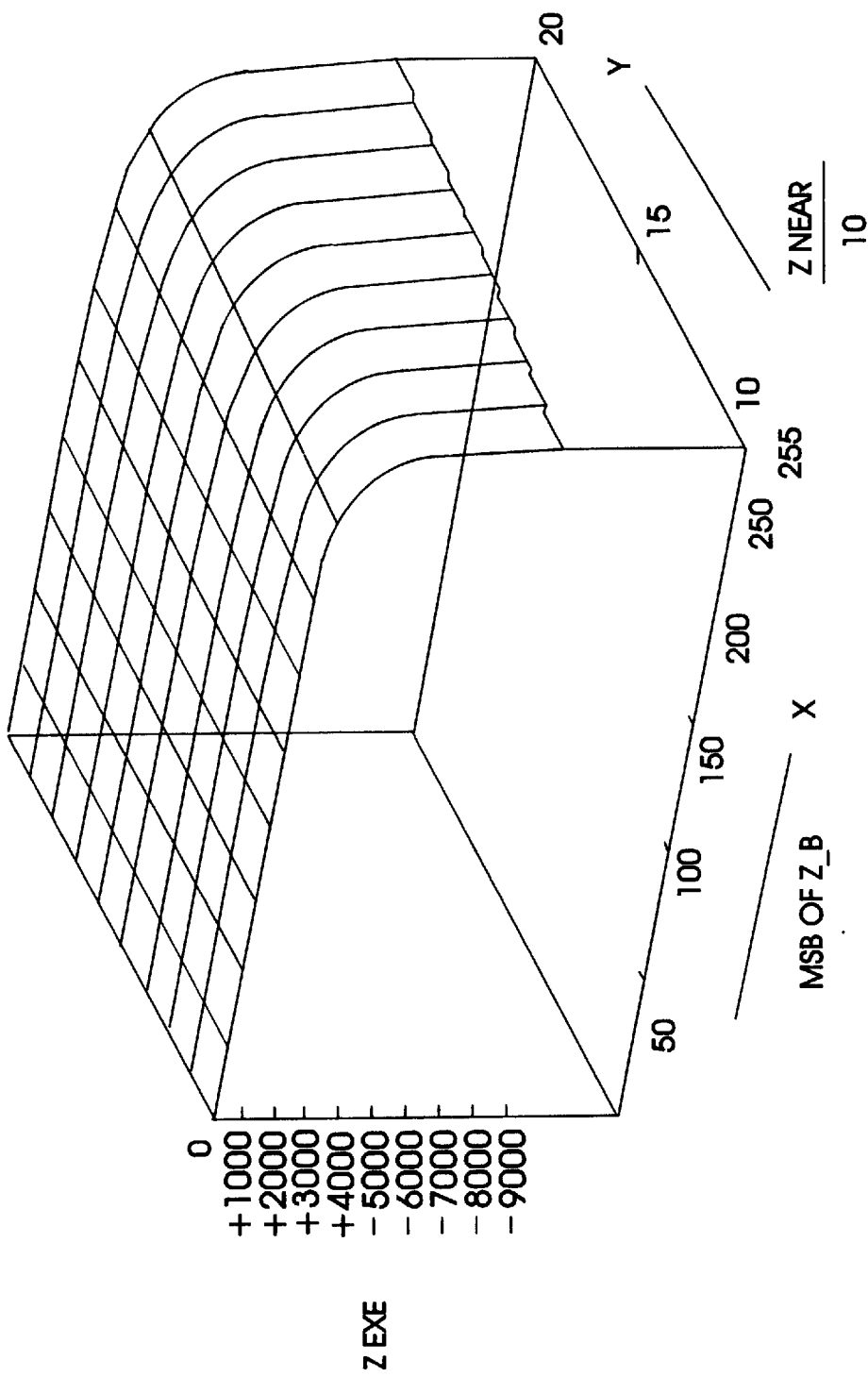

In addition, $Z_{NEAR}$ and $Z_{FAR}$ may be varied from those values discussed above. FIGS. 7(A) and (B) illustrate the effect of varying $Z_{NEAR}$ and keeping $Z_{FAR}$ fixed at 10000.0. In FIGS. 7(A) and 7(B), the $Z_{NEAR}$ value is varied from 100.0 to 200. In FIGS. 7(A) and (B), the x axis shows the upper byte portion of $Z_B$, the y axis shows $Z_{NEAR}$, and the z axis shows the corresponding $Z_{eye}$ value. In FIG. 7(A), the upper byte varies from 0x00 to 0x80. In FIG. 7(B), the upper byte varies from 0x00 to 0xFF. Thus, as the value for $Z_{NEAR}$ is increased, more and more of the range of $Z_{eye}$ is covered by checking the upper byte portion of $Z_B$. Below is a table of $Z_{NEAR}$, $Z_{FAR}$ and $Z_{eye}$ for two particular values of $Z_B$ (0x0F0000 and 0xFF0000).

| $Z_{NEAR}$ | $Z_{FAR}$ | $Z_{EYE}$ for $Z_B$ = 0x0F0000 | $Z_{EYE}$ for $Z_B$ = 0xFF0000 |
|---|---|---|---|
| 1.0 | 1000000.0 | −1.06 | −255.94 |
| 10.0 | 1000000.0 | −10.62 | −2553.52 |
| 100.0 | 1000000.0 | −1006.22 | −24963.76 |
| 1000.0 | 1000000.0 | −10062.17 | −203986.56 |

Clearly, the analysis present above can be extended to view situation where the visibility determination may be performed utilized the upper two bytes of the $Z_B$ values.

The present invention is also applicable to systems that perform parallel projections. In these systems, $$Z_{B1} - Z_{B2} = ((2^{**}ZBITS)^*(Z_{eye2} - Z_{eye1}))/(Z_{FAR} - Z_{NEAR})$$

In these systems, $Z_{eye}$ and $Z_B$ are linearly related. Thus, in order to perform visibility determination based solely on the upper byte values, the separation in $Z_{eye}$ should be $(Z_{FAR} - Z_{NEAR})/(2^{}16)$. The nature of gains for a parallel projection are therefore different from those for a perspective projection. There is no extra benefit for objects close to the $Z_{NEAR}$ plane. However, parallel projections, which are used for architectural drawings of buildings and parts are utilized less often than perspective projections. In such cases, the $Z_{FAR}$ value need not be at infinity, and bounds for $Z_{FAR}$ and $Z_{NEAR}$ can be tightened such that $(Z_{FAR} - Z_{NEAR})/(2^{}16)$ is small. Moreover, in these cases the depth complexity can be expected to be much higher than 2, which results in significant performance gains when utilizing the visibility determination scheme of the present invention.

Other embodiments of the invention will be apparent to those skilled in the art from consideration of the specification and practice of the invention disclosed herein. It is intended that the specification and examples be considered as examples only, with the true scope of the invention being indicated by the claims.

I claim:

1. In a computer graphics system wherein objects are represented by one or more primitives and wherein pixel data associated with a set S of pixels represents a view of the objects, a method for identifying whether a given primitive is visible at the set S of pixels, the method comprising the steps of:

for each pixel P belonging to set S, storing in a buffer a depth value $Z_{old}$ associated with the pixel P, wherein $Z_{old}$ comprises a plurality of portions including a most significant portion and at least one less significant portion, wherein said buffer comprises a plurality of contiguous blocks each storing corresponding portions of the depth value $Z_{old}$ for a given set SP of consecutive pixels belonging to set S;

determining a set SQ of consecutive pixels belonging to set S that cover the given primitive;

fetching the most significant portion of the depth value $Z_{old}$ of the set SQ of consecutive pixels stored in the block of the buffer associated with the set SQ of consecutive pixels;

for each pixel Q belonging to set SQ, comparing the most significant portion of the depth value $Z_{old}$ of the particular pixel fetched from the block of the buffer associated with the set SQ of consecutive pixels to the most significant portion of the computed depth value $Z_{new}$ of the particular pixel to determine if one of three conditions is satisfied:

a) the given primitive is visible at the particular pixel,
b) the given primitive is hidden at the particular pixel, or
c) it is undetermined whether the given primitive is either visible or hidden at the particular pixel;

If condition a) is satisfied, the blocks of the buffer associated with the particular pixel is updated to store the computed depth value $Z_{new}$ of the particular pixel;

If condition b) is satisfied, the processing ends with respect to the particular pixel; and If condition c) is satisfied, the fetching step and comparing step above is repeated for the next less significant portion of the depth values $Z_{old}$ and $Z_{new}$ associated with the particular pixel until the least significant portion of the depth values $Z_{old}$ and $Z_{new}$ has been processed.

2. The method of claim 1, wherein the contiguous blocks of the buffer associated with the set SQ of consecutive pixels is updated in response to a z buffer write signal that is sectioned into a plurality of segments each corresponding to a portion of the depth value $Z_{old}$ of the SQ set of consecutive pixels.

3. The method of claim 2, wherein each segment of the z buffer write signal includes:

an address field that identifies, for the particular segment, the block of the buffer that holds the corresponding portions of the depth value $Z_{old}$ for the set SQ of consecutive pixels that corresponds to the particular segment, a data field that includes a plurality of sub-fields each corresponding to one of the set SQ of consecutive pixels, wherein each sub-field stores, if need be, the portion of the depth value $Z_{old}$ that is to be updated at the corresponding pixel, and a mask that identifies which sub-fields of the data field store an updated depth value portion for the set SQ of consecutive pixels.

4. In a computer graphics system wherein objects are represented by one or more primitives and wherein pixel data associated with a set S of pixels represents a view of the objects, an apparatus for identifying whether a given primitive is visible at the plurality of pixels, the apparatus comprising:

a buffer that stores, for each pixel P belonging to set S, a depth value $Z_{old}$ associated with the pixel P, wherein $Z_{old}$ comprises a plurality of portions including a most significant portion and at least one less significant portion, wherein said buffer comprises a plurality of contiguous blocks each storing corresponding portions of the depth value $Z_{old}$ for a given set SP of consecutive pixels belonging to set S;

scan conversion logic that determines a set SQ of consecutive pixels belonging to set S that cover the given primitive, and that computes, for each pixel Q within the set SQ of consecutive pixels, a depth value $Z_{new}$ of the given primitive at the pixel Q, wherein the computed depth value $Z_{new}$ comprises a plurality of portions including a most significant portion and at least one less significant portion, and wherein the portions of the computed depth value $Z_{new}$ correspond to the portions of the stored depth values; and fetch logic, coupled to comparison logic and the buffer, for fetching from the buffer the most significant portion of the depth value $Z_{old}$ of the set SQ of consecutive pixels; and wherein the comparison logic compares, for each pixel Q within the set SQ of consecutive pixels, the most significant portion of the depth value $Z_{old}$ of the particular pixel fetched from the block of the buffer associated with the set SQ of consecutive pixels to the most significant portion of the computed depth value $Z_{new}$ of the particular pixel to determine if one of three conditions is satisfied:

a) the given primitive is visible at the particular pixel,
b) the given primitive is hidden at the particular pixel, or
c) it is undetermined whether the given primitive is either visible or hidden at the particular pixel;

If condition a) is satisfied, the comparison logic controls the buffer to store the computed depth value $Z_{new}$ of the particular pixel in the blocks of the buffer associated with the particular pixel;

If condition b) is satisfied, the processing ends with respect to the particular pixel; and If condition c) is satisfied, the fetch logic and comparison logic repeat the fetching operation and compare operation, respectively, for the next less significant portion of the depth values $Z_{old}$ and $Z_{new}$ associated with the particular pixel until the least significant portion of the depth values $Z_{old}$ and $Z_{new}$ has been processed.

5. The apparatus of claim 4, further comprising write logic, coupled to the comparison logic and the buffer, that generates a z buffer write signal in response to a request by the comparison logic for updating the buffer, wherein the z buffer write signal is sectioned into a plurality of segments each corresponding to a portion of the depth value $Z_{old}$ of the set SQ of consecutive pixels.

6. The apparatus of claim 5, wherein each segment of the z buffer write signal includes:

an address field that identifies, for the particular segment, the contiguous block in the buffer that holds the corresponding portions of the of the depth value $Z_{old}$ for the set SQ of consecutive pixels that corresponds to the segment, a data field that includes a plurality of sub-fields each corresponding to one of the set SQ of consecutive pixels, wherein each sub-field stores, if need be, the portion of the depth value $Z_{old}$ that is to be updated at the corresponding pixel, and a mask that identifies which sub-fields of the data field store an updated depth value portion for the set SQ of consecutive pixels.

* * * * *